Figure 1:
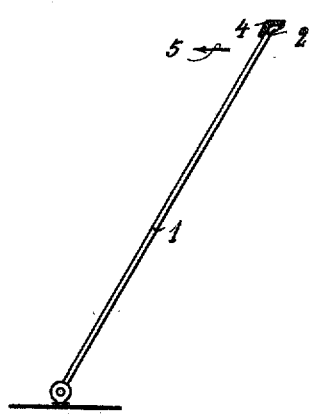

G. MERTENS.
CURRENT COLLECTOR FOR ELECTRIC CARS.
APPLICATION FILED FEB. 12, 1908.

923,194.

Patented June 1, 1909.

UNITED STATES PATENT OFFICE.

GUSTAV MERTENS, OF BLASEWITZ, NEAR DRESDEN, GERMANY.

CURRENT-COLLECTOR FOR ELECTRIC CARS.

No. 923,194.    Specification of Letters Patent.    Patented June 1, 1909.

Application filed February 12, 1908. Serial No. 415,495.

*To all whom it may concern:*

Be it known that I, GUSTAV MERTENS, engineer, a citizen of the German Empire, and a resident of Blasewitz, near Dresden, in the Kingdom of Saxony, Germany, have invented certain new and useful Improvements in Current - Collectors for Electric Cars, of which the following is a specification.

My invention relates to improvements in current collectors for electric cars, and more particularly to that class of collectors in which the current collecting element consists of a substantially horizontal bar connected to the upper end of one or two arms mounted on the car. In collectors of this class, the horizontal bar or current collecting element must be curved in such a way as to be higher at its central part where it is normally in contact with the line wire, in order to prevent the same from interfering with the cross wires supporting the latter. Furthermore, the said bar must be as light as possible in order to decrease the pressure required for holding the same in contact with the line wire, and its inertia. On account of the first one of the said requirements the said bar can not be mounted on the arms so as to swing about a horizontal axis, but it must be rigidly connected thereto. In view of the second one of the requirements stated, the cross-section of the bar must be as small as possible. On the other hand, the said bar must be as broad as possible in order to have a large contacting surface bearing against the line wire, and to decrease wear of the same by its frictional engagement with the wire. For the reasons stated, collectors have been made which are rigidly connected to the pole or poles, and which have a flat and broad cross-section. Now, in collectors of this class much difficulty arises from the fact, that they assume an angular position relatively to the line wire if normal conditions are disturbed, as, for instance if the wire is at an abnormally low level. In such a case, the collector will contact with the line wire only at its upper edge. It is thereby worn out very rapidly at its edge by the grinding action of the wire as well as by the increase of the intensity of the current connected with the decrease of the contacting surface, so that grooves are cut in said edge which will soon extend through the front margin to the under side of the collector. The lower side of the collector bar will then form an edge engaging both sides of the line wire and interfering with the supporting connections of the wire and particularly with the cross wires supporting the trolley, which will cause considerable disturbances in the operation of the system.

Now, the object of my improvements is to obviate the aforesaid disadvantages. And for this purpose, the collector bar is so constructed as to provide a large bearing surface at its front side which will come into operation when the bar assumes an inclined position relatively to the line wire.

For the purpose of explaining the invention, I have shown two examples of the same in the accompanying drawing, in which the same numerals of reference have been used in all the views to indicate corresponding parts.

Figure 2:
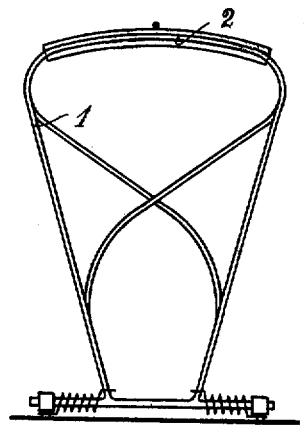
Figure 3:
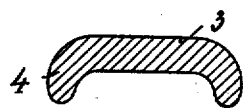
Figure 4:
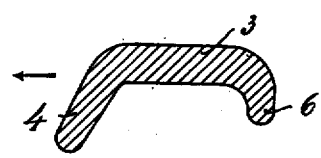

In said drawings—Figure 1, is a side view of a part of a system showing the collector bar in cross-section, Fig. 2, is a rear view of the same, Fig. 3, is a cross-section of a modified form of the collector bar on an enlarged scale, and Fig. 4, is a similar cross-section of a further modification.

Referring to the drawing, an arm 1 is mounted in any known way on the roof of an electric car. The said arm comprises two sections extending upward from the roof, and connected at their upper ends by a curved bar 2 rigidly secured to said arm sections and forming the collector element. The said collector element comprises a flat bar 3 and a rib 4 extending downward from the front edge of the bar, when taken in the direction of the travel of the collector indicated by the arrow 5 of Fig. 1. The said rib may be located at a right angle or at an obtuse angle relatively to the part 3. Now, where in case of a change of the direction of the travel of the car the collector poles are swung about a vertical axis at an angle of 180° in order to move the collector to the rear of the car, the rib 4 is provided only at one side of the bar 3, because the same edge will always be directed forward. If, however, the poles are not swung about a vertical axis in case of a change of the direction of the travel, so that for each change of the direction the edges are interchanged, both edges are provided with a rib. An example of such a collector bar is shown in Fig. 3.

By the arrangement described, a subsidiary surface is provided at the front side of the bar without materially increasing the weight of the same, which surface extends downward so as to be inoperative under normal conditions when the broad collector surface of the part 3 bears against the line wire. If, however, the collector is pressed downward so that the rear side of its bar is inclined rearward and downward, the said rib approaches the line wire so as to form a wedge like contacting surface preventing the objectionable action of the edge, even if the grooves formed on the edge extend to the lower side of the collector bar, because the said groove extends through the rib. In such cases, the groove extends over two parts of the collector bar which are disposed at an angle to each other and to the line wire, whereby the contacting surface is increased so that the wearing out of the bar and the formation of the groove take place less rapidly.

By arranging the rib at an obtuse angle relatively to the bar, the contacting surface is further improved, because, in case of an inclined position of the collector bar, the inclined rib will be nearer the line wire, than in the example shown in Fig. 3, so that the contacting surface of the groove is increased accordingly. If only one subsidiary contacting rib is provided, a strengthening rib 6 may be provided at the rear end of the bar, as shown in Fig. 4. As the subsidiary ribs also serve to strengthen the bar, the cross-section of the latter may be so small, that an increase of the weight of the bar is not caused by the arrangement described as compared with flat contacting bars of usual construction.

I claim:

1. A current collector for electric cars comprising an arm a wide flat longitudinally curved collector bar rigidly secured to said arm and adapted to move in contact with the line wire and a rib extending downward from the front edge of said collector bar.

2. A current collector for electric cars comprising an arm a wide flat longitudinally curved collector bar rigidly secured to said arm and adapted to move in contact with the line wire and a rib extending downward from the front edge of said collector bar, and disposed at an obtuse angle relatively to said bar.

In witness whereof I have hereunto set my hand in presence of two witnesses.

GUSTAV MERTENS.

Witnesses:
PAUL ARRAS,
CLÄRE SIMON.